United States Patent
Nagao et al.

(10) Patent No.: US 10,605,271 B2
(45) Date of Patent: Mar. 31, 2020

(54) ROTATING MACHINE (71) Applicant: MITSUBISHI HEAVY INDUSTRIES COMPRESSOR CORPORATION, Tokyo (JP)

(72) Inventors: Hideki Nagao, Hiroshima (JP); Masahiro Kobayashi, Hiroshima (JP)

(73) Assignee: MITSUBISHI HEAVY INDUSTRIES COMPRESSOR CORPORATION, Tokyo (JP)

(*) Notice: Subject to any disclaimer, the term of this patent is extended or adjusted under 35 U.S.C. 154(b) by 0 days.

(21) Appl. No.: 15/577,599

(22) PCT Filed: Feb. 16, 2017

(86) PCT No.: PCT/JP2017/005684
§ 371 (c)(1),
(2) Date: Nov. 28, 2017

(87) PCT Pub. No.: WO2018/150508
PCT Pub. Date: Aug. 23, 2018

(65) Prior Publication Data
US 2018/0355891 A1 Dec. 13, 2018

(51) Int. Cl.
*F04D 29/66* (2006.01)
*F04D 29/051* (2006.01)
(Continued)

(52) U.S. Cl.
CPC ......... *F04D 29/668* (2013.01); *F04D 17/122* (2013.01); *F04D 25/0606* (2013.01);
(Continued)

(58) Field of Classification Search
CPC .... F04D 29/668; F04D 29/048; F04D 29/051; F04D 29/0516; F04D 29/052;
(Continued)

(56) References Cited

U.S. PATENT DOCUMENTS 5,445,494 A * 8/1995 Hanson .................... F04D 1/06
415/107
2013/0121858 A1* 5/2013 Sekita ................... F04D 29/059
417/423.12

FOREIGN PATENT DOCUMENTS

| DE | 102015016607 A1 | 8/2016 |
|---|---|---|
| JP | S52-009404 U | 1/1977 |
| JP | H05-030706 A | 2/1993 |
| JP | 2001-045704 A | 2/2001 |
| JP | 2013-150408 A | 8/2013 |
| JP | 2014-125946 A | 7/2014 |

OTHER PUBLICATIONS

International Search Report issued in corresponding International Application No. PCT/JP2017/005684 dated Apr. 4, 2017, with English translation (4 pages).
(Continued)

*Primary Examiner* — Woody A Lee, Jr.
*Assistant Examiner* — Michael L Sehn
(74) *Attorney, Agent, or Firm* — Osha Liang LLP (57) ABSTRACT

A rotating machine includes: a casing, a rotary shaft rotatably supported in the casing and extending in a thrust direction, a first magnet installed on the rotary shaft, an attenuation mechanism supported by the casing and disposed to face the first magnet in the thrust direction, a second magnet installed in the attenuation mechanism to face the first magnet in the thrust direction and that repels the first magnet, an impeller installed on one end of the rotary shaft, and support sections that support the attenuation mechanism with respect to the casing. Furthermore, the attenuation mechanism includes: an attenuator that attenuates vibrations of the second magnet in the thrust direction, and a pushing-back unit that pushes the second magnet back toward the first magnet.

17 Claims, 6 Drawing Sheets

(51) Int. Cl.
*F16F 15/02* (2006.01)
*F16F 15/03* (2006.01)
*F16F 15/12* (2006.01)
*F04D 17/12* (2006.01)
*F04D 25/06* (2006.01)
*F04D 29/058* (2006.01)
*F04D 17/10* (2006.01)
*F16C 19/52* (2006.01)

(52) U.S. Cl.
CPC ......... *F04D 29/051* (2013.01); *F04D 29/058* (2013.01); *F16F 15/022* (2013.01); *F16F 15/03* (2013.01); *F16F 15/035* (2013.01); *F16F 15/12* (2013.01); *F04D 17/105* (2013.01); *F16C 19/527* (2013.01)

(58) Field of Classification Search
CPC ............ F05B 2240/511; F05B 2240/52; F16C 29/025; F16C 33/78
See application file for complete search history.

(56) References Cited

OTHER PUBLICATIONS

Written Opinion of the International Searching Authority issued in corresponding International Application No. PCT/JP2017/005684 dated Apr. 4, 2017 (6 pages).

\* cited by examiner

ROTATING MACHINE

This is a national stage application of International Application No. PCT/JP2017/005684, filed Feb. 16, 2017, the content of which is incorporated herein by reference.

TECHNICAL FIELD

The present invention relates to a rotating machine.

BACKGROUND ART

A compressor that is a type of rotating machine and that has a casing, a rotary shaft, an impeller, a radial bearing, and a thrust bearing. The casing has a fluid introduction port configured to introduce a fluid, and a fluid discharge port configured to discharge a fluid compressed by the impeller. The rotary shaft is accommodated in the casing, and extends in a longitudinal direction of the casing.

The impeller is installed at one end of the rotary shaft and rotates with the rotary shaft. The impeller compresses the introduced fluid, and guides the compressed fluid to the fluid discharge port. The radial bearing is disposed to face an outer circumferential surface of the rotary shaft. The radial bearing supports the rotary shaft to be rotatable. The thrust bearing is installed at the other end of the rotary shaft. The thrust bearing supports the rotary shaft in a thrust direction.

Patent Document 1 discloses a thrust bearing configured to suppress displacement of a rotary shaft in a thrust direction. The thrust bearing disclosed in Patent Document 1 is constituted by a first permanent magnet disposed at the other end of the rotary shaft, and a second permanent magnet disposed away from the first permanent magnet in the thrust direction and configured to repel the first permanent magnet.

CITATION LIST

Patent Document

Patent Document 1
Japanese Unexamined Patent Application, First Publication No. 2013-150408

Incidentally, in a state in which an exciting force in a thrust direction is applied to a rotary shaft, the rotary shaft is largely vibrated in the thrust direction. However, in the technology disclosed in Patent Document 1, there is no configuration for attenuating vibrations of the rotary shaft in the thrust direction. For this reason, it may be impossible to attenuate vibrations of the rotary shaft in the thrust direction.

SUMMARY OF INVENTION

One or more embodiments of the present invention provide a rotating machine capable of attenuating vibrations of a rotary shaft in a thrust direction.

A rotating machine according to a one or more embodiments of the present invention includes a casing; a rotary shaft rotatably supported in the casing and extending in a thrust direction; a first magnet installed on the rotary shaft; an attenuation mechanism supported by the casing and disposed to face the first magnet in the thrust direction; and a second magnet installed in the attenuation mechanism to face the first magnet in the thrust direction and configured to repel the first magnet, wherein the attenuation mechanism includes an attenuation unit ("attenuator") configured to attenuate vibrations of the second magnet in the thrust direction, and a pushing-back unit configured to push the second magnet back toward the first magnet.

In this way, as the attenuation unit configured to attenuate vibrations of the second magnet in the thrust direction is provided, a force applied in the thrust direction by the attenuation unit when the rotary shaft is moved toward the attenuation mechanism is capable of being reduced. Then, as the pushing-back unit configured to apply a force pushing the second magnet back toward the first magnet is provided, a position of a movable portion of the attenuation unit is returned to the rotary shaft side (returned to a position at which the attenuation unit functions), and the force applied in the thrust direction is capable of being repeatedly attenuated. Accordingly, vibrations of the rotary shaft in the thrust direction are capable of being attenuated.

In addition, as the first magnet installed on the rotary shaft and the second magnet installed in the attenuation mechanism to face the first magnet and configured to repel the first magnet are provided, the same function as connection by a spring in a non-contact state between the first magnet and the second magnet is capable of being provided. Accordingly, collision between the first magnet and the second magnet is capable of being avoided even when the rotary shaft is vibrated in the thrust direction, and damage to the first and second magnets is capable of being suppressed.

In addition, in the rotating machine according to one or more embodiments of the present invention, the pushing-back unit may be an elastic body.

In this way, as the elastic body is used as the pushing-back unit, the second magnet is capable of being pushed back toward the first magnet.

In addition, in the rotating machine according to one or more embodiments of the present invention, the attenuation unit may be a viscous fluid damper.

In this way, as the viscous fluid damper is used as the attenuation unit, vibrations of the rotary shaft in the thrust direction are capable of being attenuated.

In addition, in the rotating machine according to one or more embodiments of the present invention, the attenuation unit may be an eddy current damper.

In this way, as the eddy current damper is used as the attenuation unit, vibrations of the rotary shaft in the thrust direction are capable of being attenuated.

In addition, in the rotating machine according to one or more embodiments of the present invention, the attenuation unit may be a frictional resistance-applying member.

In this way, as the frictional resistance-applying member is used as the attenuation unit, vibrations of the rotary shaft in the thrust direction are capable of being attenuated.

In addition, in the rotating machine according to one or more embodiments of the present invention, the attenuation unit may be a viscoelastic member.

In this way, as the viscoelastic member is used as the attenuation unit, vibrations of the rotary shaft in the thrust direction are capable of being attenuated.

In addition, in the rotating machine according to one or more embodiments of the present invention, one of the first and second magnets may have a convex portion and the other magnet may have a concave portion in which a part of the convex portion is accommodated, and the convex portion and the concave portion may be disposed to face each other in the thrust direction.

In this way, as one of the first and second magnets has a convex portion and the other magnet has a concave portion in which a part of the convex portion is accommodated, and the convex portion and the concave portion are disposed to face each other in the thrust direction, a position of the second magnet with respect to the first magnet in a radial direction (a position of the first magnet with respect to the second magnet in the radial direction) is capable of being restricted. Accordingly, vibrations of the rotary shaft in the thrust direction are capable of being accurately transmitted to the attenuation mechanism via the first and second magnets. In addition, the rotary shaft on which the first magnet is installed is capable of being accurately held on the central axis.

In addition, in the rotating machine according to one or more embodiments of the present invention, an impeller installed on one end of the rotary shaft and a plurality of support sections configured to support the attenuation mechanism with respect to the casing may be provided, wherein the casing may include a fluid introduction section disposed to face the impeller and configured to introduce a fluid into the casing, and the attenuation mechanism may be disposed in the fluid introduction section and supported by the plurality of support members.

In this way, as the attenuation mechanism is disposed in the fluid introduction section that constitutes the casing, vibrations of the rotary shaft in the thrust direction are capable of being attenuated while suppressing an increase in size of the rotating machine.

In addition, in the rotating machine according to one or more embodiments of the present invention, the rotary shaft may include a rotary shaft main body extending in the thrust direction, and the attenuation mechanism may be installed at one end side of the rotary shaft main body.

In this way, as the attenuation mechanism is installed at one end side of the rotary shaft main body, the attenuation mechanism is capable of being disposed in an extending direction of the rotary shaft main body. Accordingly, vibrations of the rotary shaft in the thrust direction are capable of being more accurately attenuated than when the attenuation mechanism is disposed at a position deviated from the extending direction of the rotary shaft.

In addition, in the rotating machine according to one or more embodiments of the present invention, the rotary shaft may include a rotary shaft main body extending in the thrust direction, and the attenuation mechanisms are installed at both ends of the rotary shaft main body.

In this way, as the attenuation mechanisms are installed at both ends of the rotary shaft main body, the attenuation mechanisms are disposed to sandwich the rotary shaft main body in the extending direction of the rotary shaft main body (a direction in which the rotary shaft is vibrated). Accordingly, since forces applied in two directions (a thrust direction in which the rotary shaft approaches the attenuation mechanism installed at the one end, and a thrust direction in which the rotary shaft approaches the attenuation mechanism installed at the other end) are capable of being repeatedly attenuated, an effect of attenuating vibrations of the rotary shaft in the thrust direction is capable of being increased.

In addition, in the rotating machine according to one or more embodiments of the present invention, the rotary shaft may include a rotary shaft main body extending in the thrust direction and a thrust collar installed on the rotary shaft main body, and the first magnets, the second magnets, and the attenuation mechanisms may be installed at both sides of the thrust collar in the thrust direction to sandwich the thrust collar in the thrust direction.

In this way, even when the attenuation mechanisms are installed to sandwich the thrust collar from the thrust direction, vibrations of the rotary shaft in the thrust direction are capable of being attenuated.

In addition, in the rotating machine according to one or more embodiments of the present invention, the pair of attenuation mechanisms that sandwich the thrust collar may be disposed at three places or more in a circumferential direction of the thrust collar.

In this way, as the pair of attenuation mechanisms that sandwich the thrust collar are disposed at three or more places in the circumferential direction of the thrust collar, vibrations of the rotary shaft in the thrust direction are capable of being attenuated while suppressing inclination of the thrust collar with respect to the extending direction of the rotary shaft main body.

In addition, in the rotating machine according to one or more embodiments of the present invention, a first impeller installed at one end of the rotary shaft; a second impeller installed at the other end of the rotary shaft; and a plurality of support sections configured to support the attenuation mechanism with respect to the casing may be provided, wherein the casing may include a first fluid introduction section disposed to face the first impeller and configured to introduce a first fluid into the casing, and a second fluid introduction section disposed to face the second impeller and configured to introduce a second fluid into the casing, and the attenuation mechanisms may be disposed in the first fluid introduction section and the second fluid introduction section and supported by the plurality of support members.

In this way, as the attenuation mechanism is disposed in the first fluid introduction section and the attenuation mechanism is disposed in the second fluid introduction section that constitute the casing, vibrations of the rotary shaft in the thrust direction are capable of being accurately attenuated while suppressing an increase in size of the rotating machine.

According to one or more embodiments of the present invention, vibrations of the rotary shaft in the thrust direction are capable of being attenuated.

DETAILED DESCRIPTION OF EMBODIMENTS

Figure 1:
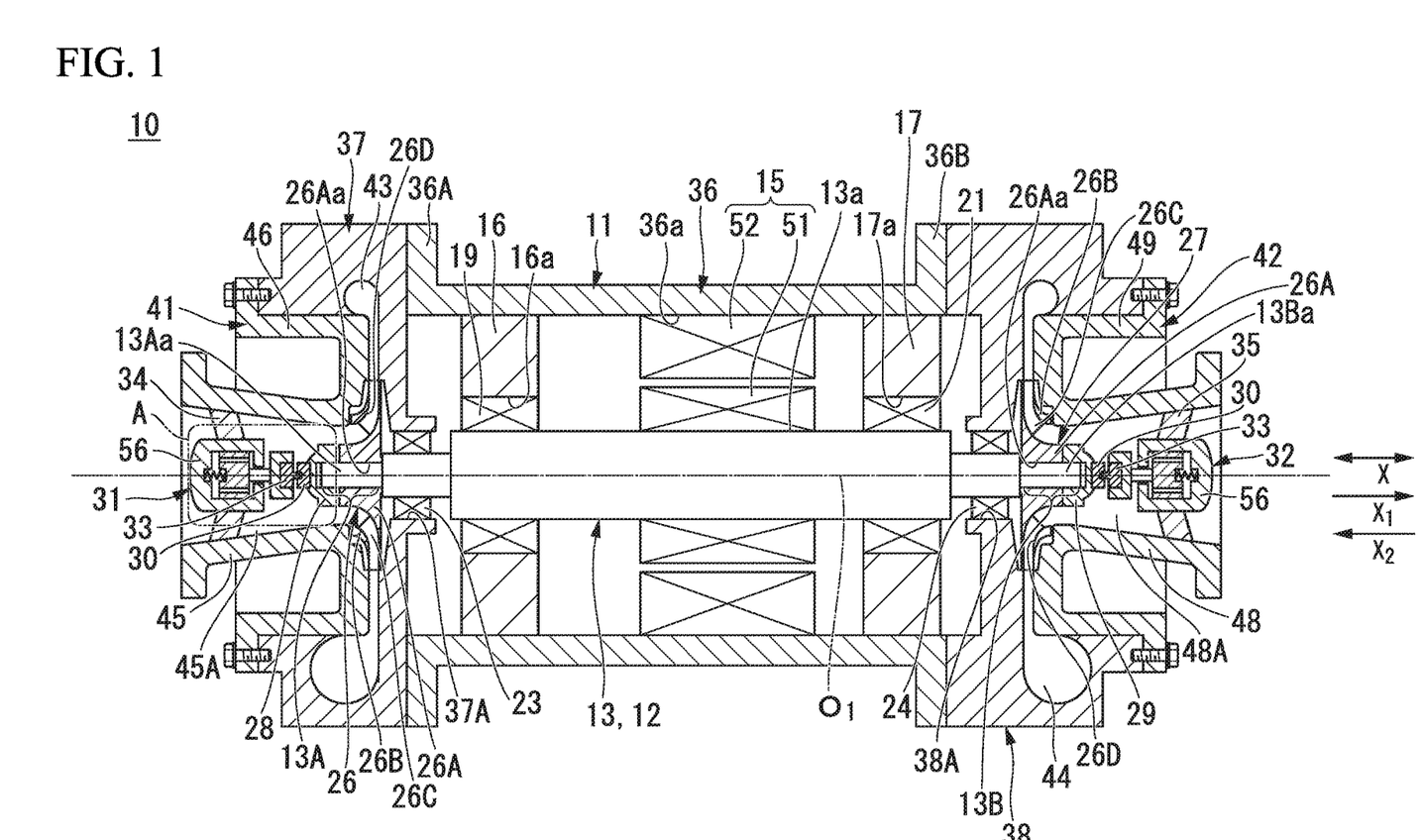
FIG. 1 is a cross-sectional view showing a schematic configuration of a rotating machine according to one or more embodiments of the present invention.

FIG. 1 is a cross-sectional view showing a schematic configuration of a rotating machine according to one or more embodiments of the present invention. An $X_1$ direction shown in FIG. 1 represents a direction from a first attenuation mechanism 31 toward a rotary shaft main body 13, an $X_2$ direction represents a direction from a second attenuation mechanism 32 toward the rotary shaft main body 13, an X direction represents a thrust direction including the $X_1$ direction and the $X_2$ direction (an extending direction of the rotary shaft main body 13), and $O_1$ represents an axis of a rotary shaft 12 extending in the X direction (hereinafter referred to as "an axis $O_1$").

Figure 2:
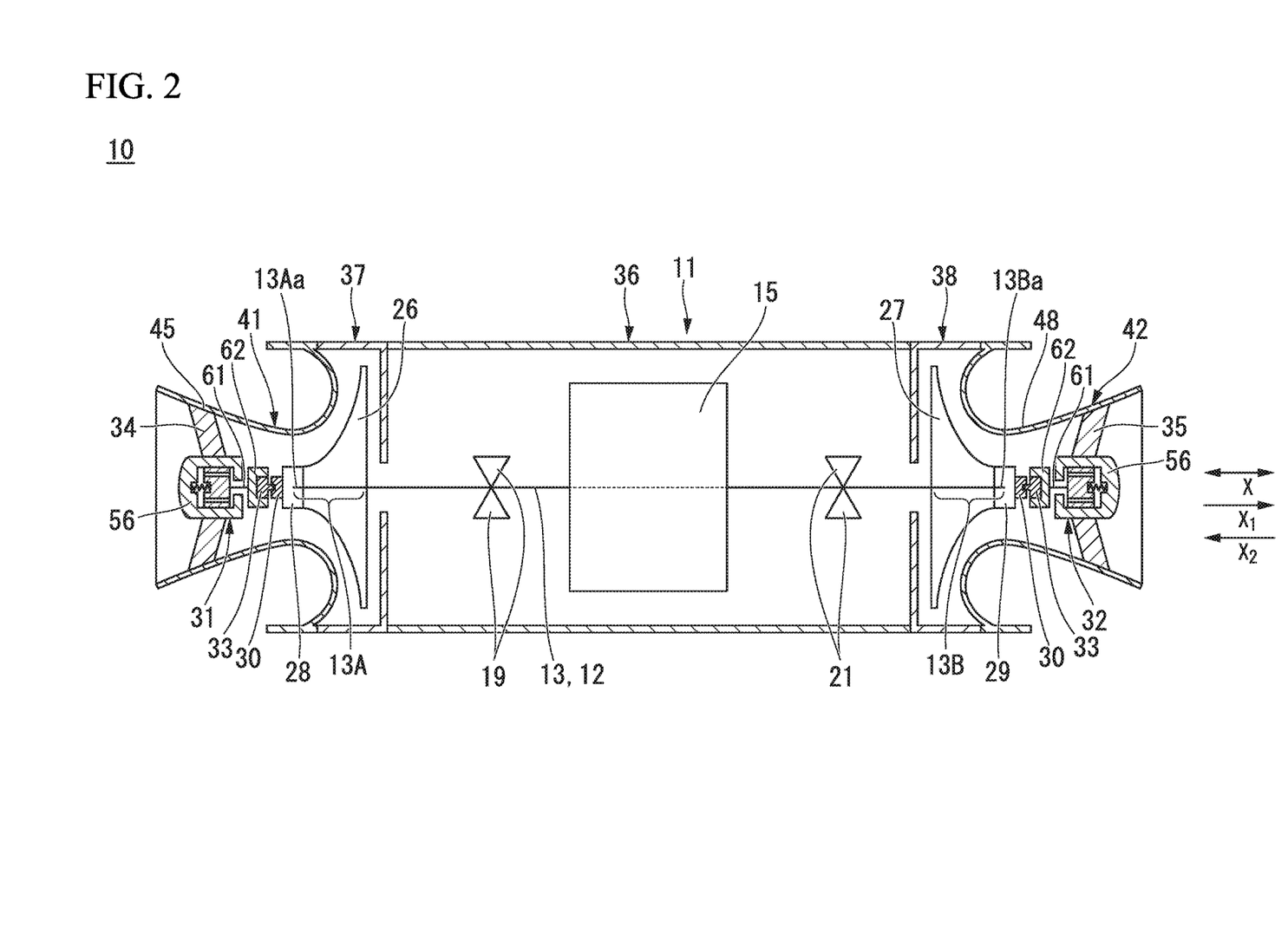
FIG. 2 is a cross-sectional view schematically showing one or more embodiments of the rotating machine.
Figure 3:
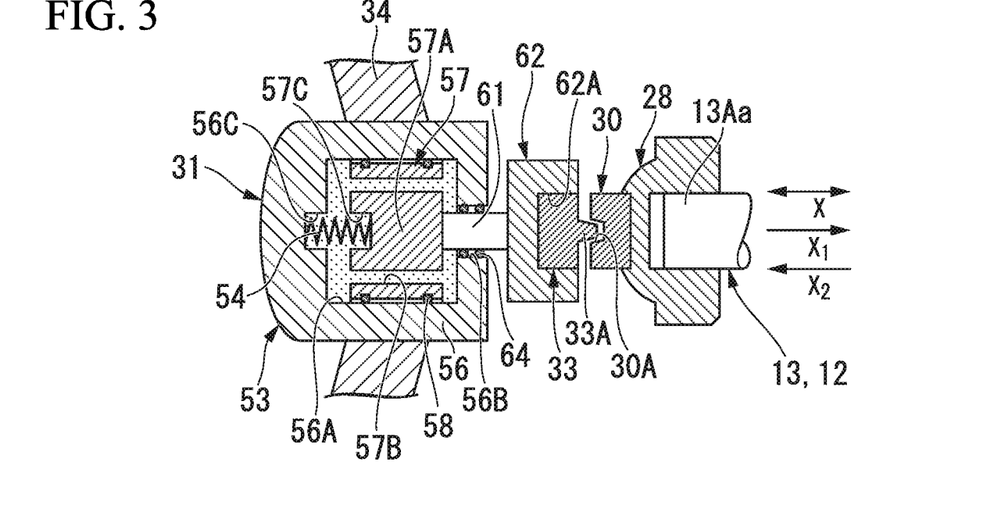
FIG. 3 is an enlarged cross-sectional view showing a portion of one or more embodiments of the rotating machine.

FIG. 2 is a cross-sectional view schematically showing the rotating machine shown in FIG. 1. In FIG. 2, components that are the same as those in the structure shown in FIG. 1 are designated by the same reference numerals. FIG. 3 is an enlarged cross-sectional view of a portion of the rotating machine shown in FIG. 1 surrounded by a region A. In FIG. 3, components that are the same as those in the structure shown in FIGS. 1 and 2 are designated by the same reference numerals.

Referring to FIGS. 1 to 3, a rotating machine 10 of one or more embodiments has a casing 11, the rotary shaft 12, a rotation-driving unit 15, bearing support members 16 and 17, radial bearings 19 and 21, seal members 23 and 24, a first impeller 26, a second impeller 27, position-restricting members 28 and 29, two first magnets 30, the first attenuation mechanism 31, the second attenuation mechanism 32, two second magnets 33, and a plurality of support members 34 and 35.

The casing 11 has a first casing section 36, second casing sections 37 and 38, and third casing sections 41 and 42, and flow paths 43 and 44.

The first casing section 36 is a cylindrical member, both ends of which are opening ends. The first casing section 36 extends in the X direction. A first flange section 36A is formed on one end of the first casing section 36. A second flange section 36B is formed on the other end of the first casing section 36.

The second casing section 37 is fixed to the first flange section 36A. An opening portion 37A into which a part of one end portion 13A of the rotary shaft main body 13 is inserted is formed in a central portion of the second casing section 37. The second casing section 38 is fixed to the second flange section 36B. An opening portion 38A into which a part of the other end portion 13B of the rotary shaft main body 13 is inserted is formed in a central portion of the second casing section 38.

The third casing section 41 has a first fluid introduction section 45 and a support section 46. The first fluid introduction section 45 is a member formed in a cylindrical shape, and extends in the X direction. The first fluid introduction section 45 has a space 45A formed in a columnar shape therein. The space 45A functions as an introduction port configured to introduce a first fluid (for example, an external air) into the first impeller 26 disposed in the casing 11. The third casing section 41 is formed at a position at which the first fluid introduction section 45 is capable of accommodating the one end portion 13A of the rotary shaft main body 13.

The support section 46 is formed at the other end of the first fluid introduction section 45. A shape of the support section 46 is a shape that widens toward the outside of the first fluid introduction section 45. A part of the support section 46 comes in contact with the second casing section 37. The support section 46 is fixed to the second casing section 37 by a bolt or the like.

The third casing section 42 has a second fluid introduction section 48 and a support section 49. The second fluid introduction section 48 is a cylindrical member and extends in the X direction. The second fluid introduction section 48 has a space 48A formed in a columnar shape inside thereof. The space 48A functions as an introduction port configured to introduce a second fluid into the second impeller 27 disposed in the casing 11. For example, the first fluid passing through the first impeller 26 may be used as the second fluid. The third casing section 42 is installed at a position at which the second fluid introduction section 48 is capable of being accommodating the other end portion 13B of the rotary shaft main body 13.

The support section 49 is installed at the other end of the second fluid introduction section 48. A shape of the support section 49 is a shape that widens toward the outside of the second fluid introduction section 48. A part of the support section 49 comes in contact with the second casing section 38. The support section 49 is fixed to the second casing section 38 by a bolt or the like.

The flow path 43 is formed between the second casing section 37 and the third casing section 41. The first fluid discharged from the first impeller 26 flows through the flow path 43. The flow path 44 is formed between the second casing section 38 and the third casing section 42. The second fluid discharged from the second impeller 27 flows through the flow path 44.

The rotary shaft 12 includes the rotary shaft main body 13. The rotary shaft main body 13 is accommodated in the casing 11 while extending in the X direction. A shape of the rotary shaft main body 13 may be, for example, a columnar shape. The rotary shaft main body 13 is supported while being rotatable by the radial bearings 19 and 21. The rotary shaft main body 13 has the one end portion 13A and the other end portion 13B.

The one end portion 13A includes one end 13Aa. A part of the one end portion 13A including the one end 13Aa is accommodated in the first fluid introduction section 45 while being separated from the first fluid introduction section 45. The one end portion 13A is a portion into which the first impeller 26 is inserted. The one end portion 13A has a diameter smaller than that of the portion of the rotary shaft main body 13 other than the other end portion 13B. Accordingly, a position of the first impeller 26 in the $X_1$ direction is capable of being restricted.

The other end portion 13B is an end portion formed at an opposite side of the one end portion 13A and includes the other end 13Ba. A part of the other end portion 13B including the other end 13Ba is accommodated in the second fluid introduction section 48 while being separated from the second fluid introduction section 48. The other end portion 13B is a portion into which the second impeller 27 is inserted. The other end portion 13B has a diameter smaller than the portion of the rotary shaft main body 13 other than the one end portion 13A. Accordingly, a position of the second impeller 27 in the $X_2$ direction is capable of being restricted.

The rotation-driving unit 15 has a rotor 51 and a stator 52. The rotor 51 is fixed to an outer circumferential surface 13a of a central portion of the rotary shaft main body 13. The stator 52 is installed on an inner circumferential surface 36a of the first casing section 36 that faces the rotor 51. The rotation-driving unit 15 rotates the rotary shaft main body 13 together with the rotor 51 by rotating the rotor 51.

The bearing support members 16 and 17 are ring-shaped members and accommodated in the first casing section 36. The bearing support members 16 and 17 are fixed to an inside of the first casing section 36. The bearing support members 16 and 17 are disposed to face each other in the X direction to sandwich the rotation-driving unit 15 therebetween. Inner circumferential surfaces 16*a* and 17*a* of the bearing support members 16 and 17 face the outer circumferential surface 13*a* of the rotary shaft main body 13 in a state that a gap in which the radial bearings 19 and 21 are capable of disposing is interposed.

The radial bearing 19 is installed on an inner circumferential surface 16*a* of the bearing support member 16. The radial bearing 21 is installed on the inner circumferential surface 17*a* of the bearing support member 17. For example, journal bearings may be used as the radial bearings 19 and 21.

The seal member 23 is formed on a portion, which defines the opening portion 37A, of the second casing section 37. The seal member 24 is formed on a portion, which defines the opening portion 38A, of the second casing section 38. The seal members 23 and 24 seal a space between the rotary shaft main body 13 and the second casing sections 37 and 38.

The first impeller 26 has a disk section 26A, a cover section 26B, a plurality of blade sections 26C, and a flow path 26D. The disk section 26A has a through-hole 26Aa formed in a center thereof. The plurality of blade sections 26C are formed to stand on the disk section 26A and disposed between the disk section 26A and the cover section 26B.

The flow path 26D is divided by the disk section 26A, the cover section 26B, and the blade sections 26C. The flow path 26D is connected to the space 45A and the flow path 43. A first fluid is introduced into the flow path 26D and the compressed first fluid is discharged to the flow path 43.

The first impeller 26 as configured above is installed on the one end portion 13A of the rotary shaft main body 13 in a state in which a part of the one end portion 13A of the rotary shaft main body 13 is inserted into the through-hole 26Aa. Accordingly, the first impeller 26 is rotated when the rotary shaft main body 13 is rotated. The first impeller 26 exposes the one end 13Aa.

The second impeller 27 has the same configuration as the first impeller 26 as described above. That is, the second impeller 27 has the disk section 26A, the cover section 26B, the plurality of blade sections 26C, and the flow path 26D. The second impeller 27 is installed on the other end portion 13B of the rotary shaft main body 13 in a state in which a part of the other end portion 13B of the rotary shaft main body 13 is inserted into the through-hole 26Aa.

The flow path 26D that constitutes the second impeller 27 is connected to the space 48A and the flow path 44. A second fluid is introduced into the flow path 26D that constitutes the second impeller 27 and the compressed second fluid is discharged to the flow path 44. The second impeller 27 exposes the other end 13Ba.

The position-restricting member 28 is installed on the one end 13Aa of the rotary shaft main body 13. The position-restricting member 28 is a member configured to restrict movement of the first impeller 26 in the $X_2$ direction. The position-restricting member 29 is installed on the other end 13Ba of the rotary shaft main body 13. The position-restricting member 29 is a member configured to restrict movement of the second impeller 27 in the $X_1$ direction.

One of the two first magnets 30 is installed on the position-restricting member 28. The one first magnet 30 is disposed to face the one end 13Aa of the rotary shaft main body 13 in the X direction to sandwich a part of the position-restricting member 28 therebetween.

The other first magnet 30 is disposed to face the other end 13Ba of the rotary shaft main body 13 in the X direction to sandwich a part of the position-restricting member 29 therebetween. The first magnet 30 has a concave portion 30A formed in a portion thereof that faces the second magnet 33. For example, a permanent magnet may be used as the first magnet 30.

The first attenuation mechanism 31 is disposed in the space 45A in a state that a flow path into which the first fluid is capable of being introduced between the first attenuation mechanism 31 and an inner surface of the first fluid introduction section 45 is capable of being formed. The first attenuation mechanism 31 has an attenuation unit 53 and a pushing-back unit 54. The attenuation unit 53 is a viscous fluid damper, and has a cylinder 56, a piston 57, seal members 58 and 64, a rod 61, and a magnet support unit 62.

The cylinder 56 is disposed in the first fluid introduction section 45 without coming in contact with the first fluid introduction section 45. The cylinder 56 is connected to the plurality of support members 34. The cylinder 56 is supported by the first fluid introduction section 45 via the plurality of support members 34. The cylinder 56 has a space 56A, an opening portion 56B, and a concave portion 56C. The space 56A is formed in the cylinder 56. The space 56A is formed in a columnar shape and extends in the X direction.

The opening portion 56B is formed to pass through a portion of the cylinder 56 that faces the first magnet 30. A part of the rod 61, the seal member 58, the piston 57, and a part of the pushing-back unit 54 are disposed in the cylinder 56 in a state in which the cylinder 56 is filled with the viscous fluid. For example, oil, a magnetic fluid, silicone gel, or the like, may be used as the viscous fluid.

The concave portion 56C is formed in a portion of the piston 57 that faces a surface opposite to a surface to which the rod 61 is connected. The concave portion 56C is disposed on an extension of the one end 13Aa of the rotary shaft main body 13. A part of the pushing-back unit 54 is accommodated in the concave portion 56C.

The piston 57 has a piston main body 57A, a plurality of through-holes 57B, and a concave portion 57C. The piston main body 57A is disposed in the space 56A in the cylinder 56 while being movable in the X direction. The plurality of through-holes 57B are formed in a portion of the piston main body 57A positioned at further outside than a connecting position between the piston main body 57A and the rod 61. The plurality of through-holes 57B are holes through which the viscous fluid is movable, and pass through the piston main body 57A in the X direction.

When the piston 57 is pushed in the X direction (in the case of a disposition example in FIG. 3, in the $X_2$ direction), resistance occurs due to movement of the viscous fluid through the plurality of through-holes 57B, and vibrations of the second magnet 33 in the X direction are attenuated. In this way, as the vibrations of the second magnet 33 in the X direction are attenuated, vibrations of the rotary shaft 12 in the X direction are attenuated.

The concave portion 57C is formed in a portion of the piston main body 57A opposite to a side to which the rod 61 is connected. The concave portion 57C is disposed to face the concave portion 56C in the X direction. A part of the pushing-back unit 54 is accommodated in the concave portion 57C. The concave portion 57C is disposed to face in the X direction the rod 61 and to sandwich a part of the piston main body 57A therebetween.

In this way, as the concave portion 57C in which a part of the pushing-back unit 54 is accommodated is formed to face the rod 61 in the X direction and to sandwich a part of the piston main body 57A therebetween, the piston 57 is capable of being pushed back in the $X_1$ direction by the pushing-back unit 54 while an inclination of the piston 57 with respect to the X direction is suppressed.

The seal member 58 is installed between an inner circumferential surface of the cylinder 56 and an outer circumferential surface of the piston main body 57A.

The rod 61 extends in the X direction and is inserted into the opening portion 56B. The rod 61 has one end connected to the piston main body 57A and the other end connected to the magnet support unit 62.

The magnet support unit 62 has an accommodating portion 62A, which accommodates the second magnet 33, at a portion that faces the first magnet 30. The magnet support unit 62 moves in the X direction together with the piston 57 and the rod 61.

The seal member 64 is installed between the cylinder 56 that defines the opening portion 56B and an outer circumferential surface of the rod 61.

The pushing-back unit 54 is installed in the cylinder 56. One end portion of the pushing-back unit 54 is fixed to the cylinder 56, which defines the concave portion 56C, while being accommodated in the concave portion 56C. The other end portion of the pushing-back unit 54 is fixed to the piston 57, which defines the concave portion 57C, while being accommodated in the concave portion 57C.

In this way, as a part of the pushing-back unit 54 is disposed in the concave portions 56C and 57C that face each other in the X direction, a displacement direction of the pushing-back unit 54 is capable of being guided to become the X direction.

The pushing-back unit 54 extends in the X direction and is configured to be movable in the X direction. The pushing-back unit 54 pushes the second magnet 33 back in the $X_1$ direction (a direction toward the first magnet 30) when the piston 57 is moved in the $X_2$ direction (in the case of FIG. 3). Accordingly, the pushing-back unit 54 pushes the piston 57 that is a movable portion of the attenuation unit back in the $X_1$ direction (a direction toward the rotary shaft).

In this way, as the pushing-back unit 54 pushes the second magnet 33 that moved in the $X_2$ direction back in the $X_1$ direction, vibrations of the rotary shaft main body 13 in the X direction are capable of being repeatedly attenuated by the attenuation unit 53.

For example, while an elastic body (for example, a spring) may be used as the pushing-back unit 54, a pair of magnets that are disposed to repel each other may be used instead of the elastic body.

While the spring that is the elastic body is shown as an example of the pushing-back unit 54 in FIGS. 1 to 3, in this case, a spring constant of the spring may be set to be equal to a repulsive force between the first magnet 30 and the second magnet 33.

The first attenuation mechanism 31 as configured above may be disposed such that, for example, a central axis thereof coincides with the axis $O_1$ of the rotary shaft 12. As the first attenuation mechanism 31 is disposed at such a position, the first attenuation mechanism 31 is capable of being suppressed from becoming an obstacle when the first fluid is introduced into the first impeller 26.

According to the first attenuation mechanism 31 as configured above, a force applied in the X direction by the attenuation unit 53 when the rotary shaft main body 13 is moved in the $X_2$ direction (a direction toward the first attenuation mechanism 31) is capable of being reduced. Then, as the pushing-back unit 54 configured to apply a force of pushing the piston 57 that is a movable portion of the attenuation unit 53 back in the $X_1$ direction (toward the rotary shaft main body 13) is provided, a position of the piston 57 of the attenuation unit 53 is returned toward the rotary shaft main body 13 (returned to a position at which the attenuation unit 53 functions), and a force applied in the X direction is capable of being repeatedly attenuated. Accordingly, vibrations of the rotary shaft main body 13 in the X direction are capable of being attenuated.

The second attenuation mechanism 32 has the same configuration as the first attenuation mechanism 31 as described above except that the second attenuation mechanism 32 is disposed in the space 48A in the second fluid introduction section 48. The first and second attenuation mechanisms 31 and 32 are disposed at both ends (the one end 13Aa and the other end 13Ba) of the rotary shaft main body 13.

In this way, as the first and second attenuation mechanisms 31 and 32 are installed on both ends of the rotary shaft main body 13, the first and second attenuation mechanisms 31 and 32 are capable of being disposed in the extending direction of the rotary shaft main body 13 so as to sandwich the rotary shaft main body 13. Accordingly, since the forces applied in the $X_1$ direction and the $X_2$ direction (the direction approaching the second attenuation mechanism 32 from the first attenuation mechanism 31 and the direction approaching the first attenuation mechanism 31 from the second attenuation mechanism 32) are capable of being repeatedly attenuated, an attenuation effect of vibrations of the rotary shaft 12 in the X direction is capable of being increased.

In addition, as the first and second attenuation mechanisms 31 and 32 are installed at both ends of the rotary shaft main body 13, in comparison with the case in which the first and second attenuation mechanisms 31 and 32 are disposed at positions deviated in the extending direction (the axis $O_1$ direction) of the rotary shaft, vibrations of the rotary shaft 12 in the X direction are capable of being accurately attenuated.

One of the two second magnets 33 is installed in the accommodating portion 62A of the magnet support unit 62, which constitutes the first attenuation mechanism 31, in a direction repelling the first magnet 30. The other second magnet 33 is installed in the accommodating portion 62A of the magnet support unit 62, which constitutes the second attenuation mechanism 32, in a direction of repulsion of the first magnet 30. The first and second magnets 30 and 33 are disposed to face each other in the X direction. The facing portions of the first and second magnets 30 and 33 have the same polarity (S poles or N poles).

According to the above-mentioned configuration, since a slight gap is formed between the first magnet 30 and the second magnet 33, the same function in a case of connection in a non-contact state between the first magnet 30 and the second magnet 33 by a spring is capable of being provided. Accordingly, since collision between the first magnet 30 and the second magnet 33 is capable of being suppressed even when the rotary shaft 12 is vibrated in the X direction, damage to the first and second magnets 30 and 33 is capable of being suppressed.

The second magnet 33 has a convex portion 33A that faces the concave portion 30A, which is formed in the first magnet 30, in the X direction. A shape of the convex portion 33A is a shape such that a part thereof is capable of disposing in the concave portion 30A. The part of the convex portion 33A is disposed in the concave portion 30A.

In the way, as the concave portion 30A is formed in the first magnet 30 and the convex portion 33A partially accommodated in the concave portion 30A is formed in the second magnet 33, a position of the second magnet 33 with respect to the first magnet 30 in the radial direction (a position of the first magnet 30 with respect to the second magnet 33 in the radial direction) is capable of being restricted. Accordingly, vibrations of the rotary shaft 12 in the X direction are capable of being accurately transmitted to the first and second attenuation mechanisms 31 and 32. In addition, the rotary shaft on which the first magnet is installed is capable of being accurately held on the central axis.

For example, a permanent magnet or an electromagnet may be used as the second magnet 33.

Further, while the case in which the concave portion 30A is formed in the first magnet 30 and the convex portion 33A is formed in the second magnet 33 has been exemplarily described as an example in FIGS. 1 to 3, for example, a convex portion may be formed in the first magnet 30 and a concave portion may be formed in the second magnet 33. In addition, the concave portion 30A and the convex portion 33A may be formed according to necessity or may be unnecessary.

The plurality of support members 34 are installed in the first fluid introduction section 45. The plurality of support members 34 have one ends connected to an inner wall of the first fluid introduction section 45 and the other ends connected to the cylinder 56 that constitutes the first attenuation mechanism 31. The plurality of support members 34 are disposed in a circumferential direction of the cylinder 56. A shape of each of the plurality of support members 34 may be, for example, a blade shape. In this way, as each of the plurality of support members 34 has the blade shape, interference with introduction of the first fluid by the plurality of support members 34 is capable of being suppressed.

The plurality of support members 35 are installed in the second fluid introduction section 48. The plurality of support members 35 have one ends connected to an inner wall of the second fluid introduction section 48 and the other ends connected to the cylinder 56 that constitutes the second attenuation mechanism 32. The plurality of support members 35 are disposed in the circumferential direction of the cylinder 56. A shape of each of the plurality of support members 35 may be, for example, a blade shape. In this way, as the shape of the plurality of support members 35 has the blade shape, interference with introduction of the second fluid by the plurality of support members 35 is capable of being suppressed.

According to the rotating machine 10 of one or more embodiments, as the first and second magnets 30 and 33 disposed to face each other are installed at both ends (the one end 13Aa and the other end 13Ba) of the rotary shaft main body 13 and the first and second attenuation mechanisms 31 and 32 configured to support the second magnet 33 are installed, a force applied in the X direction when the rotary shaft 12 is moved in the X direction is capable of being reduced by the attenuation unit 53 that constitutes the first and second attenuation mechanisms 31 and 32.

Then, a position of the piston 57 of the attenuation unit 53 is returned to the rotary shaft 12 side (returned to a position at which the attenuation unit 53 functions) by the pushing-back unit 54 that constitutes the first and second attenuation mechanisms 31 and 32, and a force applied in the X direction is capable of being repeatedly attenuated. Accordingly, vibrations of the rotary shaft 12 in the X direction are capable of being attenuated.

In addition, as the first and second magnets 30 and 33 that are disposed in directions to repel each other are provided, the same function in a case that the first magnet 30 and the second magnet 33 do not come in contact with each other and they are connected by the spring. Accordingly, since the contact between the first magnet 30 and the second magnet 33 is capable of being suppressed even when the rotary shaft 12 is vibrated in the X direction, damage to the first and second magnets 30 and 33 is capable of being suppressed.

Further, while the case in which the first and second attenuation mechanisms 31 and 32 are installed at both sides of the rotary shaft main body 13 has been exemplarily described as an example in one or more embodiments, for example, the attenuation mechanism (the first attenuation mechanism 31 or the second attenuation mechanism 32) may be installed at one of both ends of the rotary shaft main body 13. In this case, an external force-applying mechanism configured to constantly apply a force in a direction toward the attenuation mechanism (the $X_1$ direction or the $X_2$ direction) may be provided at the other end of the rotary shaft main body 13. The rotating machine configured as above is capable of obtaining the same effect as that of the rotating machine 10 of one or more embodiments.

Figure 4:
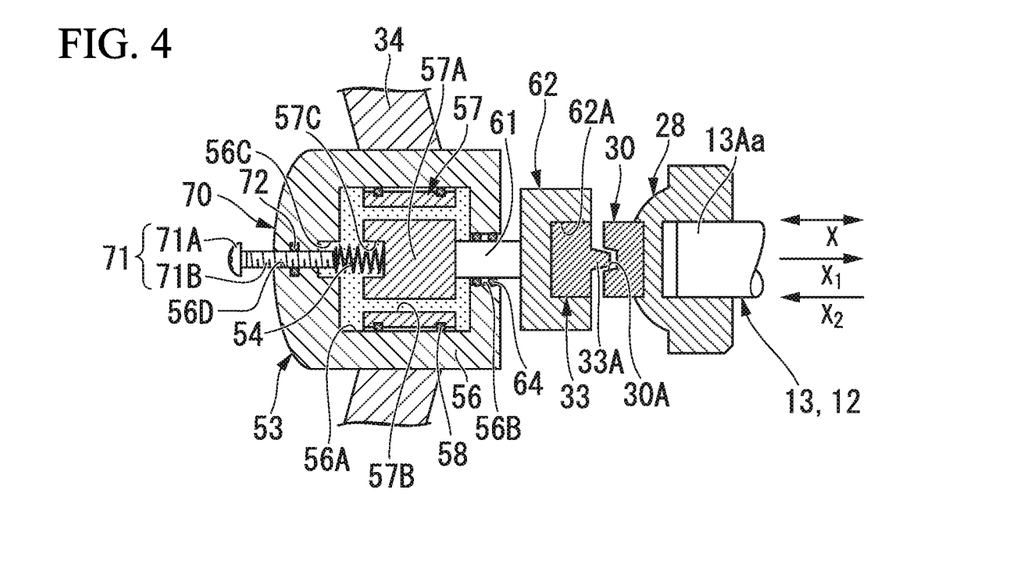
FIG. 4 is a cross-sectional view showing a schematic configuration of an attenuation mechanism according to one or more embodiments of the present invention.

FIG. 4 is a cross-sectional view showing a schematic configuration of an attenuation mechanism according to one or more embodiments. In FIG. 4, components that are the same as those in the structure shown in FIG. 3 are designated by the same reference numerals.

Referring to FIG. 4, an attenuation mechanism 70 according to one or more embodiments will be described. The attenuation mechanism 70 has the same configuration as the first attenuation mechanism 31 except that a screw hole 56D, a screw 71, and a seal member 72 are provided in the first attenuation mechanism 31 described in one or more embodiments.

The screw hole 56D is formed to pass through a portion of the cylinder 56 that faces the concave portion 56C in the X direction. The screw hole 56D extends in the X direction and reaches the concave portion 56C. The screw hole 56D exposes one end of the pushing-back unit 54.

The screw 71 has a head section 71A, and a shaft section 71B formed on one end of the head section 71A. The screw 71 is screwed into the screw hole 56D from the outside of the cylinder 56. The other end of the shaft section 71B abuts one end of the pushing-back unit 54. The pushing-back unit 54 is contracted when the screw 71 is rotated to move the screw 71 in the $X_1$ direction, and the pushing-back unit 54 is expanded when the screw 71 is rotated to move the screw 71 in the $X_2$ direction. The seal member 72 is installed between the cylinder 56 that defines the screw hole 56D and an outer circumferential surface of the shaft section 71B.

According to the attenuation mechanism 70 according to one or more embodiments, as the screw hole 56D, the screw 71 and the seal member 72 are provided, when a spring is used as the pushing-back unit 54, the screw 71 and the seal member 72, a position of the other end of the shaft section 71B in the X direction (in the case of a disposition example in FIG. 4, the $X_2$ direction) is capable of being adjusted. Accordingly, stiffness of the spring in the X direction is capable of being adjusted.

Figure 5:
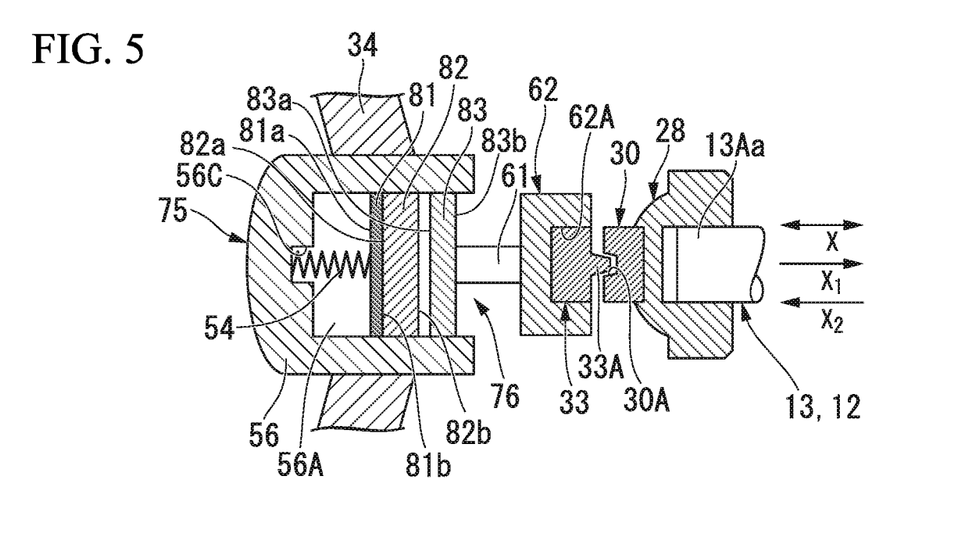
FIG. 5 is a cross-sectional view showing a schematic configuration of an attenuation mechanism according to one or more embodiments of the present invention.

FIG. 5 is a cross-sectional view showing a schematic configuration of an attenuation mechanism according to one or more embodiments. In FIG. 5, the same components as the structure shown in FIG. 3 are designated by the same reference numerals.

An attenuation mechanism 75 according to one or more embodiments will be described with reference to FIG. 5. The attenuation mechanism 75 has the same configuration as the first attenuation mechanism 31 except that an end portion of the second magnet 33 side of the cylinder 56 that constitutes the first attenuation mechanism 31 described in one or more embodiments is an opening end, and an attenuation unit 76 is provided instead of the attenuation unit 53.

The attenuation unit 76 is an eddy current damper. The attenuation unit 76 has the same configuration as the attenuation unit 53 described above except that a support plate 81, a metal plate 82 and a magnet 83 are provided instead of the cylinder 56, the piston 57 and the seal members 58 and 64.

The support plate 81 is disposed in the cylinder 56 such that the outer circumferential surface comes in contact with the inner circumferential surface of the cylinder 56. The support plate 81 has first and second surfaces 81a and 81b that are perpendicular to the X direction. The first surface 81a is disposed at the pushing-back unit 54 side. The second surface 81b is disposed at an opposite side of the first surface 81a. The other end of the pushing-back unit 54 is connected to the first surface 81a side of the support plate 81.

The metal plate 82 is formed of a metal material having a high electrical conductivity. The metal plate 82 is disposed in the cylinder 56. The metal plate 82 has first and second surfaces 82a and 82b that are perpendicular to the X direction. The first surface 82a faces the second surface 81b of the support plate 81. The second surface 82b is disposed at an opposite side of the first surface 82a. The metal plate 82 is installed on the support plate 81 such that the first surface 82a comes in contact with the second surface 81b. An outer circumferential surface of the metal plate 82 comes in contact with the inner circumferential surface of the cylinder 56. As a metal material having a high electrical conductivity that constitutes the metal plate 82, for example, Cu, Au, or the like, may be used.

The magnet 83 is formed in a plate shape. The magnet 83 is disposed in the cylinder 56 such that the outer circumferential surface comes in contact with the inner circumferential surface of the cylinder 56. The magnet 83 has first and second surfaces 83a and 83b that are perpendicular to the X direction. The first surface 83a faces the second surface 82b of the metal plate 82. The second surface 83b is disposed at an opposite side of the first surface 83a. The second surface 83b side of the magnet 83 is connected to the rod 61.

The magnet 83 is installed on the metal plate 82 such that the first surface 83a comes in contact with the second surface 82b. An outer circumferential surface of the magnet 83 comes in contact with the inner circumferential surface of the cylinder 56. For example, a permanent magnet may be used as the magnet 83.

The support plate 81, the metal plate 82, and the magnet 83 are configured to be movable in the X direction.

According to the attenuation mechanism 75 of one or more embodiments, as an eddy current damper is provided as the attenuation unit 76, the same effects as in the first and second attenuation mechanisms 31 and 32 described in one or more embodiments are capable of being obtained.

Figure 6:
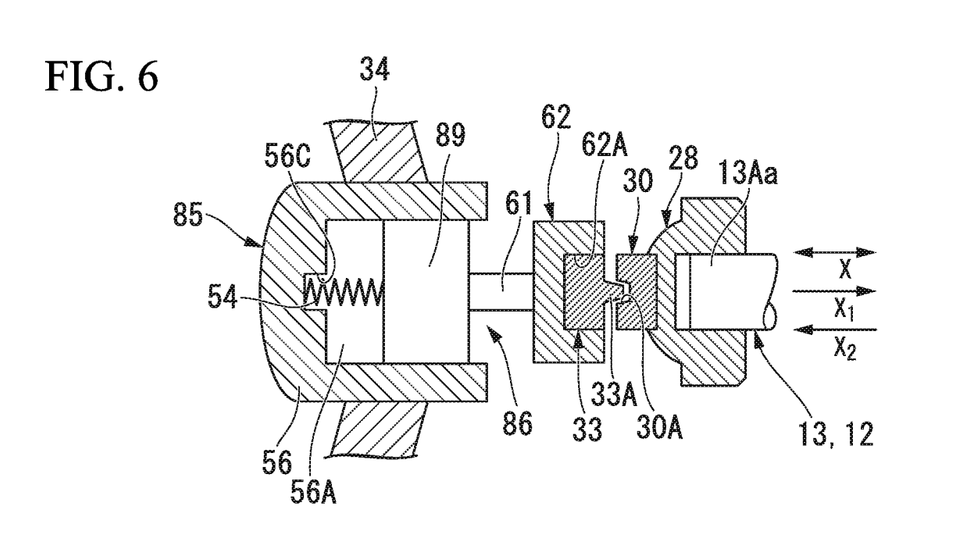
FIG. 6 is a cross-sectional view showing a schematic configuration of an attenuation mechanism according to one or more embodiments of the present invention.

FIG. 6 is a cross-sectional view showing a schematic configuration of an attenuation mechanism according to one or more embodiments. In FIG. 6, the same components as in the structure shown in FIG. 5 are designated by the same reference numerals.

An attenuation mechanism 85 according to one or more embodiments will be described with reference to FIG. 6. The attenuation mechanism 85 has the same configuration as in the attenuation mechanism 75 except that an attenuation unit 86 is provided instead of the attenuation unit 76 that constitutes the attenuation mechanism 75 of one or more embodiments.

The attenuation unit 86 has the same configuration as in the attenuation unit 76 except that a frictional resistance-applying member 89 is provided instead of the structure constituted by the support plate 81, the metal plate 82 and the magnet 83.

The frictional resistance-applying member 89 is installed in the cylinder 56. The frictional resistance-applying member 89 has an outer circumferential surface that comes in contact with the inner circumferential surface of the cylinder 56. The frictional resistance-applying member 89 is configured to be movable in the X direction. When the frictional resistance-applying member 89 is moved in the X direction, a frictional force between the frictional resistance-applying member 89 and the cylinder 56 occurs. Vibrations of the rotary shaft 12 in the X direction are suppressed by the frictional force.

When the material of the cylinder 56 is a metal material having good wear resistance, for example, a metal or ceramic having good wear resistance, or a material obtained by forming a resin-based frictional material on a metal surface of a piston may be used as the material of the frictional resistance-applying member 89.

According to the attenuation mechanism 85 of one or more embodiments, as the attenuation unit 86 includes the frictional resistance-applying member 89, vibrations of the rotary shaft 12 in the X direction are capable of being attenuated with a simple configuration.

Figure 7:
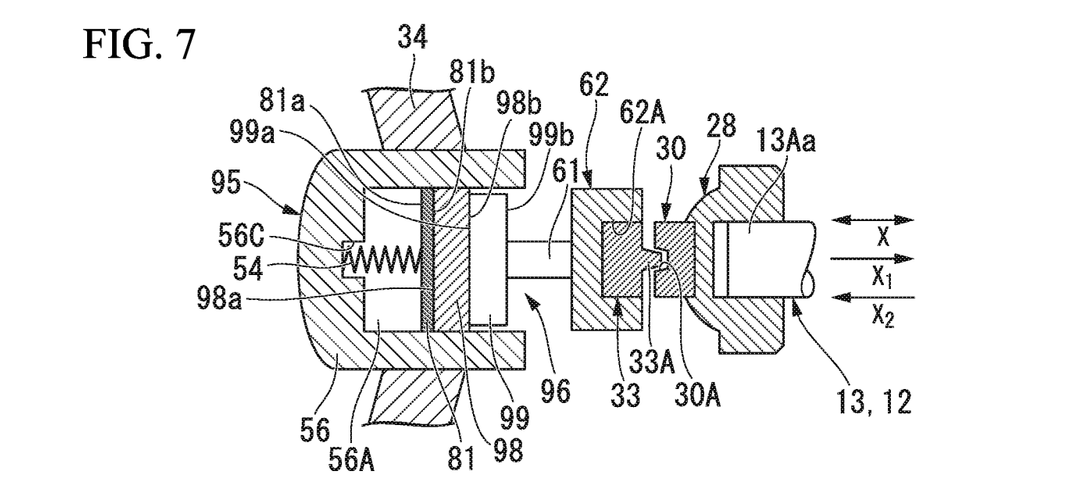
FIG. 7 is a cross-sectional view showing a schematic configuration of an attenuation mechanism according to one or more embodiments of the present invention.

FIG. 7 is a cross-sectional view showing a schematic configuration of an attenuation mechanism according to one or more embodiments. In FIG. 7, the same components as in the structure shown in FIG. 5 are designated by the same reference numerals.

An attenuation mechanism 95 according to one or more embodiments will be described with reference to FIG. 7. The attenuation mechanism 95 has the same configuration as that of the attenuation mechanism 75 except that an attenuation unit 96 is provided instead of the attenuation unit 76 that constitutes the attenuation mechanism 75 of one or more embodiments.

The attenuation unit 96 has the same configuration as that of the attenuation unit 76 except that a viscoelastic member 98 and a support plate 99 are provided instead of the metal plate 82 and the magnet 83.

The viscoelastic member 98 is a plate-shaped member formed of a viscoelastic material. The viscoelastic member 98 is disposed in the cylinder 56. The viscoelastic member 98 is sandwiched between the support plate 81 and the support plate 99 in the X direction. The viscoelastic member 98 has first and second surfaces 98a and 98b that are perpendicular to the X direction. The first surface 98a comes in contact with the second surface 81b of the support plate 81. The viscoelastic member 98 has a function of attenuating vibrations of the rotary shaft 12 in the X direction (in the case of the disposition example in FIG. 7, the $X_2$ direction). For example, rubber may be exemplified as a viscoelastic material that is a material of the viscoelastic member 98.

The support plate 99 is disposed in the cylinder 56 in a state in which the outer circumferential surface comes in contact with the inner circumferential surface of the cylinder 56. The support plate 99 has first and second surfaces 99a and 99b that are perpendicular to the X direction. The first surface 99a comes in contact with the second surface 98b of the viscoelastic member 98. The rod 61 is connected to the second surface 99b side of the support plate 99.

The support plates 81 and 99 and the viscoelastic member 98 are configured to be integrally movable in the X direction.

According to the attenuation mechanism 95 of one or more embodiments, as the attenuation unit 96 includes the viscoelastic member 98, vibrations of a rotary shaft 12 in the X direction are capable of being attenuated.

Further, the screw hole 56D, the screw 71, and the seal member 72 shown in FIG. 4 may be installed in the attenuation mechanisms 75, 85 and 95 shown in FIGS. 5 to 7. In this case, the same effects as the attenuation mechanism 70 shown in FIG. 4 are capable of being obtained. In addition, the attenuation mechanisms 70, 75, 85 and 95 shown in FIGS. 4 to 7 may be installed at both ends of the rotary shaft main body 13.

Figure 8:
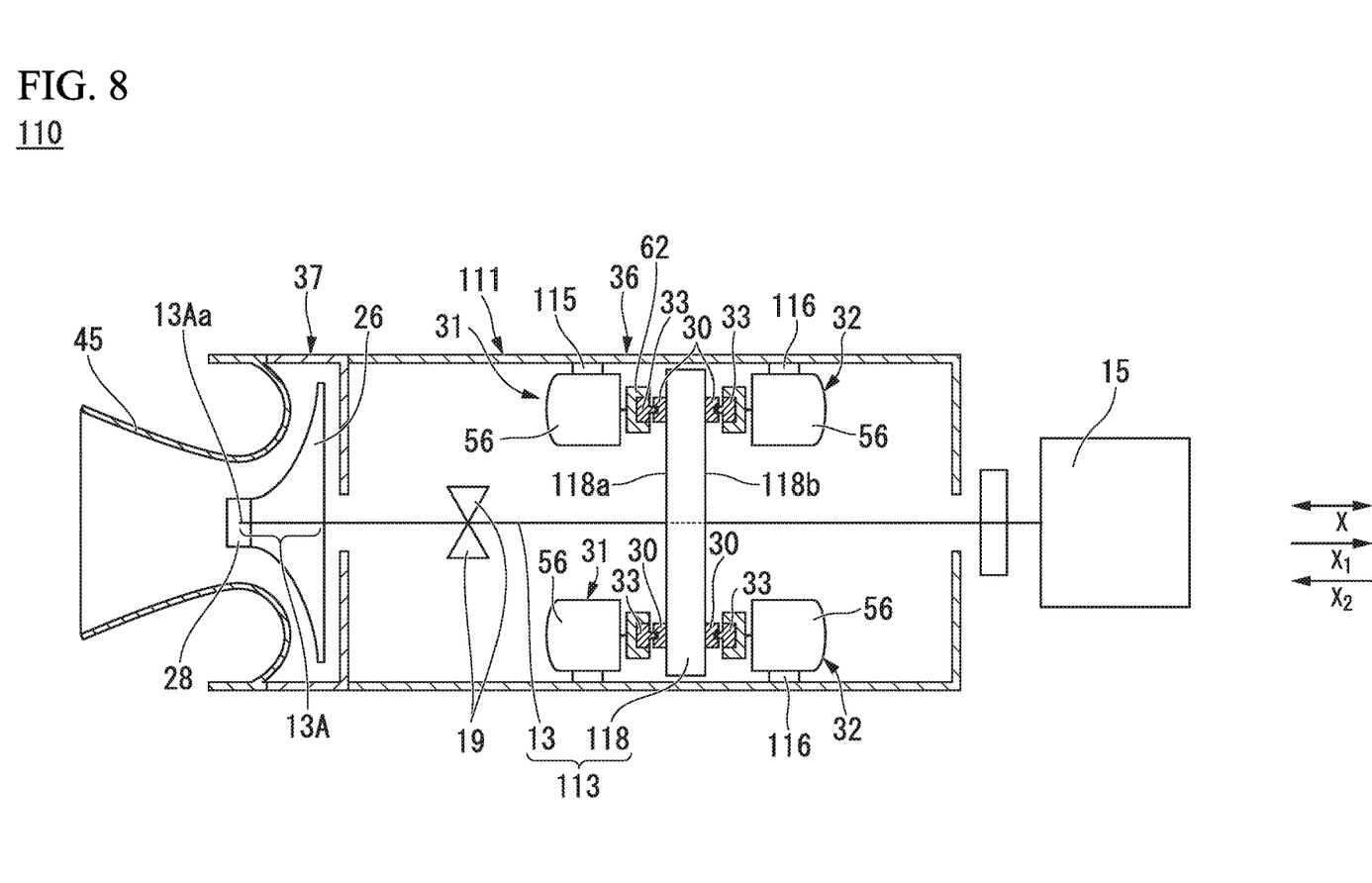
FIG. 8 is a cross-sectional view showing a schematic configuration of a rotating machine according to one or more embodiments of the present invention.

FIG. 8 is a cross-sectional view showing a schematic configuration of a rotating machine according to one or more embodiments of the present invention. In FIG. 8, the same components as the structure shown in FIG. 2 are designated by the same reference numerals.

Referring to FIG. 8, a rotating machine 110 of one or more embodiments has a configuration in which the radial bearing 21, the second impeller 27, and the position-restricting member 29 that constitute the rotating machine 10 of one or more embodiments are removed from the components. In the rotating machine 110, positions of the first and second attenuation mechanisms 31 and 32, the first and second magnets 30 and 33, and the rotation-driving unit 15 that are installed in the rotating machine 10 are changed.

The rotating machine 110 has the same configuration as that of the rotating machine 10 of one or more embodiments except that the casing 111 and the rotary shaft 113 are provided instead of the casing 11 and the rotary shaft 12 that constitute the rotating machine 10, and support members 115 and 116 are further provided.

The casing 111 has the same configuration as that of the casing 11 except that the second and third casing sections 38 and 42 are removed from the casing 11 described in one or more embodiments.

The rotary shaft 113 has the rotary shaft main body 13 described in one or more embodiments, and a thrust collar 118. The thrust collar 118 is installed at a portion of the rotary shaft main body 13, the portion being accommodated in the first casing section 36. The thrust collar 118 is a circular plate member having a diameter larger than an outer diameter of the rotary shaft main body 13.

The thrust collar 118 has first and second surfaces 118a and 118b that are perpendicular to the X direction. The first surface 118a faces the first impeller 26. The second surface 118b is disposed at an opposite side of the first surface 118a.

The rotation-driving unit 15 is installed outside the casing 111 in a state in which the rotation-driving unit 15 is capable of rotating the rotary shaft 12.

The first magnets 30 are installed on the first and second surfaces 118a and 118b of the thrust collar 118 to face each other in the X direction with the thrust collar 118 sandwiched therebetween. The pairs of first magnets 30 disposed to face each other are disposed at three places or more at predetermined intervals in the circumferential direction of the thrust collar 118.

The first attenuation mechanisms 31 are installed in the first casing section 36 to face the first magnets 30 installed on the first surface 118a of the thrust collar 118. The first attenuation mechanisms 31 are disposed at three places or more in the circumferential direction of the thrust collar 118.

The second attenuation mechanisms 32 are installed in the first casing section 36 to face the first magnets 30 installed on the second surface 118b of the thrust collar 118. The second attenuation mechanisms 32 are disposed to face the first attenuation mechanisms 31 with the thrust collar 118 sandwiched therebetween in the X direction. The second attenuation mechanisms 32 are disposed at three places or more in the circumferential direction of the thrust collar 118.

The support member 115 has one end connected to the inner wall of the first casing section 36 and the other end connected to the cylinder 56 that constitutes the first attenuation mechanism 31. Accordingly, the support member 115 supports the first attenuation mechanism 31.

The support member 116 has one end connected to the inner wall of the first casing section 36 and the other end connected to the cylinder 56 that constitutes the second attenuation mechanism 32. Accordingly, the support member 116 supports the second attenuation mechanism 32.

According to the rotating machine 110 of one or more embodiments, as the structures including the first magnets 30, the second magnets 33, and the attenuation mechanisms (the first attenuation mechanisms 31 or the second attenuation mechanisms 32) are disposed at both sides (the first surface 118a side and the second surface 118b side) of the thrust collar 118 to sandwich the thrust collar 118 in the X direction, vibrations of the rotary shaft 113 in the X direction are capable of being attenuated.

In addition, as the structures including the first magnets 30, the second magnets 33 and the first attenuation mechanisms 31 and the structures including the first magnets 30, the second magnets 33 and the second attenuation mechanisms 32 are installed at three places or more each in the circumferential direction of the thrust collar 118, vibrations of the rotary shaft 113 in the X direction are capable of being attenuated while suppressing inclination of the thrust collar 118 with respect to the X direction.

INDUSTRIAL APPLICABILITY

The rotating machine of one or more embodiments of the present invention is capable of being applied to a compressor, a turbine, or any other similarly suitable machine.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST 10, 110 Rotating machine
11, 111 Casing
12, 113 Rotary shaft
13 Rotary shaft main body
13a Outer circumferential surface
13A One end portion
13Aa One end
13B Other end portion
13Ba Other end
15 Rotation-driving unit
16, 17 Bearing support member
16a, 17a, 36a Timer circumferential surface
19, 21 Radial bearing
23, 24, 58, 64, 72 Seal member
26 First impeller
26A Disk
26Aa, 57B Through-hole
26B Cover section
26C Blade section
26D, 43, 44 Flow path
27 Second impeller
28, 29 Position-restricting member
30 First magnet 30A, 56C, 57C Concave portion
31 First attenuation mechanism
32 Second attenuation mechanism
33 Second magnet
33A Convex portion
34, 35, 115, 116 Support member
36 First casing section
36A First flange section
36B Second flange section
37, 38 Second casing section
37A, 38A, 56B Opening portion
41, 42 Third casing section
45 First fluid introduction section
45A, 48A, 56A Space
46, 49 Support section
48 Second fluid introduction section
51 Rotor
52 Stator
53, 76, 86, 96 Attenuation unit
54 Pushing-back unit
56 Cylinder
56D Screw hole
57 Piston
57A Piston main body
61 Rod
62 Magnet support unit
62A Accommodating portion
70, 75, 85, 95 Attenuation mechanism
71 Screw
71A Head section
71B Shaft section
81, 99 Support plate
81a, 82a, 83a, 98a, 99a, 118a First surface
81b, 82b, 83b, 98b, 99b, 118b Second surface
82 Metal plate
83 Magnet
89 Frictional resistance-applying member
98 Viscoelastic member
118 Thrust collar
A Region

The invention claimed is:

1. A rotating machine, comprising:
a casing;
a rotary shaft rotatably supported in the casing and extending in a thrust direction;
a first magnet installed on the rotary shaft;
an attenuation mechanism supported by the casing and disposed to face the first magnet in the thrust direction;
a second magnet installed in the attenuation mechanism to face the first magnet in the thrust direction and to repel the first magnet;
a first impeller installed on one end of the rotary shaft; and
a plurality of support sections that support the attenuation mechanism with respect to the casing, wherein
the attenuation mechanism comprises:
  a damper that attenuates vibrations of the second magnet in the thrust direction, and
  a pushing-back unit that comprises an elastic body or a pair of repelling magnets and that pushes the second magnet back toward the first magnet,
the casing comprises a first fluid introduction opening disposed to face the first impeller and that introduces a fluid into the casing, and
the attenuation mechanism is disposed in the first fluid introduction opening and supported by a plurality of support members.

2. The rotating machine according to claim 1, wherein the elastic body is a spring.

3. The rotating machine according to claim 2, wherein the damper is a viscous fluid damper.

4. The rotating machine according to claim 2, wherein the damper is an eddy current damper.

5. The rotating machine according to claim 2, wherein the damper is a frictional resistance-applying member.

6. The rotating machine according to claim 2, wherein the damper is a viscoelastic member.

7. The rotating machine according to claim 1, wherein the damper is a viscous fluid damper.

8. The rotating machine according to claim 1, wherein the damper is an eddy current damper.

9. The rotating machine according to claim 1, wherein the damper is a frictional resistance-applying member.

10. The rotating machine according to claim 1, wherein the damper is a viscoelastic member.

11. The rotating machine according to claim 1, wherein
one of the first and second magnets has a convex portion and the other magnet has a concave portion in which a part of the convex portion is accommodated, and
the convex portion and the concave portion are disposed to face each other in the thrust direction.

12. The rotating machine according to claim 1,
wherein the rotary shaft comprises a rotary shaft main body extending in the thrust direction, and
the attenuation mechanism is installed at one end side of the rotary shaft main body.

13. The rotating machine according to claim 1, comprising:
two of the first magnet, wherein
the rotary shaft comprises a rotary shaft main body extending in the thrust direction, and
the two first magnets are installed at both ends of the rotary shaft main body.

14. The rotating machine according to claim 13, comprising:
two of the attenuation mechanism;
two of the second magnet; and
a second impeller installed at the other end of the rotary shaft, wherein
the plurality of support sections supports the two attenuation mechanisms with respect to the casing, wherein
the casing further comprises
  a second fluid introduction opening disposed to face the second impeller and that introduces a second fluid into the casing, and
the two attenuation mechanisms are disposed in the first fluid introduction opening and the second fluid introduction opening and supported by the plurality of support members.

15. A rotating machine, comprising:
a casing;
a rotary shaft rotatably supported in the casing and extending in a thrust direction;
a pair of first magnets installed on the rotary shaft;
a pair of attenuation mechanisms supported by the casing and disposed to face the first magnets in the thrust direction; and
a pair of second magnets installed in the attenuation mechanisms to face the first magnets in the thrust direction and to repel the first magnets,
wherein the rotary shaft comprises:
  a rotary shaft main body extending in the thrust direction; and a thrust collar installed on the rotary shaft main body, and wherein the first magnets, the second magnets, and the attenuation mechanisms are installed at both sides of the thrust collar in the thrust direction to sandwich the thrust collar in the thrust direction.

16. The rotating machine according to claim 15, wherein the rotating machine comprises at least three pairs of attenuation mechanisms that sandwich the thrust collar, wherein the pairs of attenuation mechanisms are disposed at three places or more in a circumferential direction of the thrust collar.

17. The rotating machine according to claim 15, wherein one of the pair of first and the pair of second magnets have a convex portion and the other pair of magnets have a concave portion in which a part of the convex portion is accommodated, and the convex portion and the concave portion are disposed to face each other in the thrust direction.

* * * * *